United States Patent [19]

Yamada et al.

[11] Patent Number: 4,528,219
[45] Date of Patent: Jul. 9, 1985

[54] MULTI-LAYER PLASTIC LAMINATE STRUCTURE

[75] Inventors: Muneki Yamada, Fujisawa; Akira Sakamoto, Yokohama, both of Japan

[73] Assignee: Toyo Seikan Kaisha, Ltd., Tokyo, Japan

[21] Appl. No.: 574,082

[22] Filed: Jan. 26, 1984

[30] Foreign Application Priority Data

Jan. 26, 1983 [JP] Japan .................................. 58-9966

[51] Int. Cl.³ ........................ B65D 1/00; B32B 27/08; B32B 27/28; B32B 27/36
[52] U.S. Cl. ..................................... 428/35; 156/327; 156/331.1; 156/332; 428/213; 428/355; 428/475.2; 428/480; 428/483; 428/913
[58] Field of Search .............. 428/35, 480, 483, 475.2, 428/213, 355, 349, 913; 156/331.1, 332, 327

[56] References Cited

U.S. PATENT DOCUMENTS

| 4,254,169 | 3/1981 | Schroeder | 428/35 |
| 4,407,897 | 10/1983 | Farrell et al. | 428/35 X |
| 4,430,142 | 2/1984 | Ochi et al. | 428/35 X |
| 4,430,288 | 2/1984 | Bonis | 428/35 X |

FOREIGN PATENT DOCUMENTS

| 56-88428 | 7/1981 | Japan . |
| 56-103221 | 8/1981 | Japan . |
| 57-42493 | 9/1982 | Japan | 428/35 |

OTHER PUBLICATIONS

Williams et al., Journal of Polymer Science, vol. 61, pp. 353–359, 1962.
P. Akcatel et al., J. Poly. Sci., Polymer Chemistry Edition, 14, pp. 1537–1545, 1976.

Primary Examiner—Thomas J. Herbert
Attorney, Agent, or Firm—Sherman & Shalloway

[57] ABSTRACT

Disclosed is a multi-layer plastic structure comprising a layer of a polyester composed mainly of ethylene terephthalate units or butylene terephthalate units and a gas barrier layer containing an olefin-vinyl alcohol copolymer, said two layers being laminated together through a layer of a thermoplastic resin adhesive containing ester groups and amide groups.

15 Claims, 2 Drawing Figures

MULTI-LAYER PLASTIC LAMINATE STRUCTURE

BACKGROUND OF THE INVENTION (1) Field of the Invention

The present invention relates to a plastic laminate structure. More particularly, the present invention relates to a plastic laminate structure comprising an ethylene terephthalate type or butylene terephthalate type polyester layer and a gas barrier layer of an olefin-vinyl alcohol copolymer, both the layers being tightly bonded together through an ester-amide type adhesive layer. Especially, the present invention relates to a plastic laminate structure which is excellent in the combination of the gas barrier property, rigidity, interlaminar peel strength and transparency and is valuably used for the production of a sealed storage vessel.

(2) Description of the Prior Art

Since polyethylene terephthalate is excellent in the moldability and can be molecularly oriented biaxially, it is widely used for the production of light-weight plastic vessels excellent in the impact resistance, rigidity, gas barrier property, light weight and transparency, especially bottles for drinks. However, the gas permeability of this polyester bottle is significantly higher than that of a glass bottle, and it is said that the shelf-life of the polyester bottle is about three months when it is filled with a carbonated drink such as cola.

An olefin-vinyl alcohol copolymer such as a saponified ethylene-vinyl acetate copolymer is known as a thermoformable resin excellent in the oxygen barrier property. Furthermore, it is known that this resin can be used in combination with an olefin resin excellent in the moisture resistance for the production of an undrawn or drawn multi-layer plastic vessel.

Proposals have been made as to vessels composed of a laminate of a polyester and an olefin-vinyl alcohol copolymer, and it is naturally expected that this laminate will be excellent in the combination of the gas barrier property, impact resistance and rigidity. However, this laminate has not practically been used for the production of a vessel, especially a biaxially drawn blow-molded vessel. The reason is considered to be that a thermoplastic adhesive capable of forming a strong interlaminar bonding between the polyester and olefin-vinyl alcohol copolymer has not been found out.

SUMMARY OF THE INVENTION

We found that a thermoplastic resin adhesive having both the ester group-containing recurring units and amide recurring units in the melted state can tightly bond a polyester layer and an olefin-vinyl alcohol copolymer layer and this adhesive has an interlaminar bonding force which is practically satisfactory in a draw-molded vessel formed by draw-blow molding, solid phase air-pressure forming or press molding.

It is therefore a primary object of the present invention to provide a plastic laminate structure comprising an ethylene terephthalate or butylene terephthalate type polyester layer and an olefin-vinyl alcohol copolymer layer, which are tightly bonded to each other.

Another object of the present invention is to provide a plastic laminate structure which is excellent in the gas barrier property, impact resistance, rigidity, interlaminar peel strength and transparency and is valuably used for the production of a sealed vessel in the form of a bottle or cup.

In accordance with one aspect of the present invention, there is provided a multi-layer plastic structure comprising a layer of a polyester composed mainly of ethylene terephthalate units or butylene terephthalate units and a gas barrier layer containing an olefin-vinyl alcohol copolymer, said two layers being laminated together through a layer of a thermoplastic resin adhesive containing ester groups and amide groups.

In accordance with another aspect of the present invention, there is provided a bottle-shaped vessel obtained by hollow forming of the above-mentioned multi-layer plastic structure.

In accordance with still another aspect of the present invention, there is provided a cup-shaped vessel obtained by sheet forming of the above-mentioned multi-layer plastic structure.

DETAILED DESCRIPTION OF THE PREFERRED EMBODIMENTS

Figure 1:
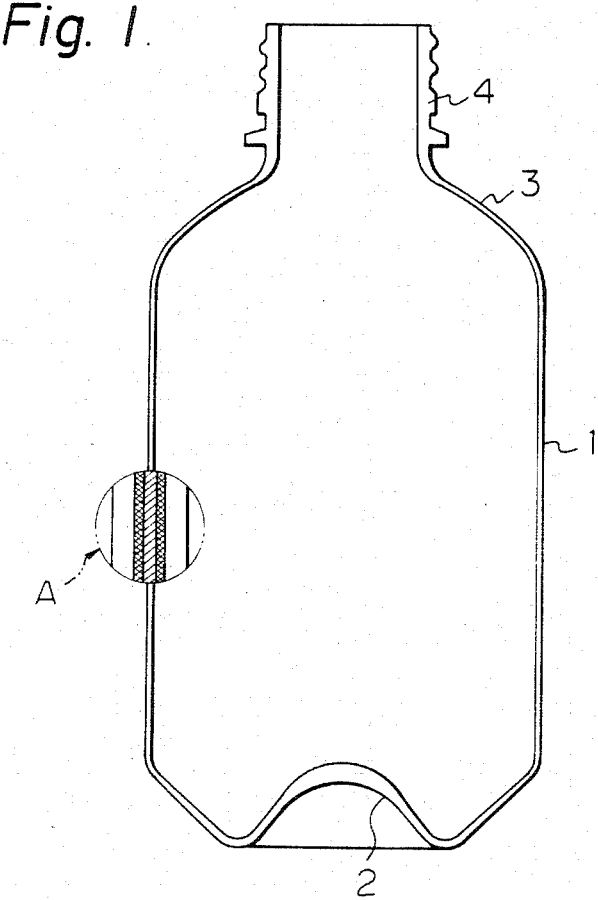
FIG. 1 is a view showing the longitudinal section of a biaxially drawn blow-molded bottle as an embodiment of the laminate structure of the present invention.

Referring to FIG. 1 showing an embodiment of a bottle-shaped plastic laminate structure, this vessel comprises a barrel 1, a bottom 2 connected to the lower end of the barrel, a frustoconical shoulder 3 connected to the upper end of the barrel and a neck 4 connected to the upper end of the shoulder, which are integrally formed by draw-blowing of a multi-layer parison described in detail hereinafter.

This bottle is obtained by draw-blow-forming a parison biaxially, that is, by mechanically drawing the parison in the axial direction of the vessel and blowing a fluid into the parison to blow-draw the parison in the circumferential direction. In this bottle, the resin constituting the barrel 1 is molecularly oriented in the axial direction of the bottle and the circumferential direction of the bottle.

Figure 2:
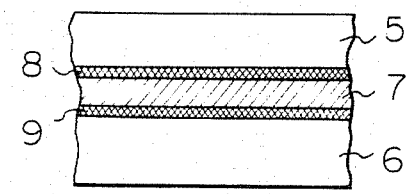
FIG. 2 is an enlarged sectional view illustrating the layer structure of the wall of the barrel of the bottle shown in FIG. 1.

Referring to FIG. 2 which is an enlarged sectional view of the wall of the barrel of this bottle, the wall of the bottle of this embodiment comprises an inner surface layer 5 composed of a polyester comprising ethylene terephthalate units as the main recurring units, an outer surface layer 6 composed of the same polyester and an intermediate gas barrier layer 7 containing an olefin-vinyl alcohol copolymer, which is interposed between the layers 5 and 6. These polyester layers 5 and 6 are tightly bonded to the gas barrier layer 7 through layers 8 and 9 of a thermoplastic resin adhesive having both the ester groups and amide groups, which is described in detail hereinafter.

The present invention is based on the novel finding that when a thermoplastic resin containing both the ester groups and amide groups in the polymer chain is used for heat bonding of a polyethylene terephthalate layer and an olefin-vinyl alcohol copolymer layer, a strong and durable bonding is formed between both the resin layers.

The thermoplastic resin adhesive used in the present invention is characterized by a chemical structure having both the ester group-containing recurring units and amide recurring units. The reasons why this ester-amide type adhesive shows a high heat bondability to the above-mentioned two resin layers have not completely been elucidated, but it is believed that this strong bonding can be attained for such reasons as described below. At the heat bonding step, because of the presence of the ester-amide recurring units, it is considered that the resin adhesive forms strong chemical bonds such as hydrogen bonds to the hydroxyl groups in the olefin-vinyl alcohol copolymer and the ester units in polyethylene terephthalate. It is known that a good homogeneity or good compatibility is attained between an olefin-vinyl alcohol copolymer and a polyamide (see, for example, Japanese Patent Publication No. 42493/82). Also in the heat-bonded interface between the adhesive layer of the present invention and the olefin-vinyl alcohol copolymer layer, it is considered that mingling of the molecule chains of both the resins is caused and the heat bondability between the two resins is improved. Furthermore, it is considered that since the thermoplastic resin adhesive has ester group-containing recurring units, also in the heat-bonded interface between the thermoplastic resin adhesive and the polyethylene terephthalate layer, good mingling of the molecule chains of both the resins is caused. Moreover, in view of the fact that a blend of an olefin-vinyl alcohol copolymer and a polyamide shows good stretching characteristics at the draw-forming step, it is considered that occurrence of bonding fracture or concentration of the stress is moderated even at the draw-forming step for formation of a vessel.

In the present invention, it is generally important that the resin adhesive should contain in the molecule chain ester groups at a concentration of 53 to 990 millimoles, especially 89 to 800 millimoles, per 100 g of the resin and amide groups at a concentration of 45 to 840 millimoles, especially 89 to 800 millimoles, per 100 g of the resin. If the amide group concentration is lower than 45 millimoles per 100 g of the resin, the heat bondability to the olefin-vinyl alcohol copolymer resin tends to decrease, and if the ester group concentration is lower than 53 millimoles per 100 g of the resin, the heat bondability to the polyester tends to decrease. If the ester group or amide group concentration is too high, the heat bondability or operation adaptability is readily reduced.

In the adhesive used in the present invention, the ester groups and amide groups may be present in one molecule chain of the resin, or they may be present in different molecule chains of a polymer blend. Furthermore, a combination of these two modes may be adopted.

More specifically, in accordance with one embodiment of the present invention, a polymer having ester group-containing recurring units and amide recurring units in one polymer chain, that is, a polyester-amide, is used as the adhesive resin.

As the polyester-amide there can be mentioned a polyester-amide comprising recurring units represented by the following formula:

$$\{CO-R^1-CONH-R^2-NHCO-R^1-COOR^3O\} \quad (1)$$

wherein $R^1$ stands for a phenylene group or alkylene group, and $R^2$ and $R^3$ each stand for an alkylene group, a polyester-amide comprising recurring units represented by the following formula:

$$\{O-R^4-CONH-R^5-CO\} \quad (2)$$

wherein $R^4$ and $R^5$ each stand for an alkylene group or aralkylene group,
and a polyester-amide comprising at least one kind of recurring units represented by the following formula:

$$-CO-R^1-COO-R^3-O- \quad (3)$$

wherein $R^1$ stands for a phenylene group or alkylene group, and $R^3$ stands for an alkylene group,
and at least one kind of recurring units represented by the following formulae:

$$\{NH-R^2-NHCO-R^6-CO\} \quad (4)$$

and $$\{NH-R^5-CO\} \quad (5)$$

wherein $R^2$ stands for an alkylene group, $R^6$ stands for a phenylene group or alkylene group, and $R^5$ stands for an alkylene group or aralkylene group.

In the above-mentioned formulae, the phenylene group may be a p-phenylene group or an m-phenylene group. As the alkylene group, there can be mentioned alkylene groups having 2 to 12 carbon atoms, especially ethylene, tetramethylene, hexamethylene and decamethylene groups. As the aralkylene group, there can be mentioned benzylene and xylylene groups. These groups may be the same or different in the respective recurring units.

A polyester-amide of the type of the general formula (1) is obtained, for example, by polycondensing a corresponding bis-ester amide with a corresponding glycol at a high temperature in the presence of an ester exchange catalyst, as described in Journal of Polymer Science, 61, pages 353-359 (1962).

A polyester-amide of the type of the general formula (2) is obtained, for example, by polycondensing a corresponding hydroxyamide acid in the presence of a catalyst such as toluene-sulfonic acid, as described in Journal of Polymer Science, Polymer Chemistry Edition, 14, pages 1537-1545 (1976).

A block polyester amide comprising units of the general formula (3) and units of the general formula (4) or (5) is obtained, for example, by condensing a corresponding polyester prepolymer with a corresponding nylon salt or ω-amino acid in the presence of a catalyst such as a titanium alkoxide, as described in Japanese Patent Application Laid-Open Specifications No. 88428/81 and No. 103221/81.

In view of the adaptability to the heat bonding operation, it is preferred that a polyester-amide such as mentioned above should have a melting point or flow-initiating temperature of 100° to 280° C., especially 150° to 240° C. Furthermore, it is preferred that the polyester-amide should have a film-forming molecular weight, especially an intrinsic viscosity of at least 0.01 l/g as measured at a temperature of 30° C. in a mixed solvent comprising phenol and tetrachloroethane at a weight ratio of 50/50.

In the polyester-amide of the type of the general formula (1) or the polyester-amide block copolymer comprising the recurring units of the general formula (3) and the recurring units of the general formula (4), as the dibasic acid component (HOOC—$R^1$—COOH or HOOC—R⁶—COOH), there can be mentioned terephthalic acid, isophthalic acid, succinic acid, adipic acid, sebacic acid, decane-dicarboxylic acid, dimer acid and cyclohexanedicarboxylic acid. As the diol component (HOR³OH), there can be mentioned ethylene glycol, 1,4-butane-diol, propylene glycol, hexane-diol, neopentane glycol, diethylene glycol, triethylene glycol and xylylene glycol. As the diamine component (NH₂—R²—NH₂), there can be mentioned ethylene diamine, tetramethylene diamine, hexamethylene diamine, octamethylene diamine and decamethylene diamine.

As the hydroxycarboxylic acid component (HO—R⁴—COOH) in the polyester-amide of the type of the general formula (2), there can be mentioned ω-hydroxycaproic acid, ω-hydroxycaprylic acid, ω-hydroxylauric acid and p-hydroxyethylbenzene-carboxylic acid. As the aminocarboxylic acid component (NH₂—R⁵—COOH) forming the amide blocks in the polyester-amide of the formula (2) or the recurring units of the formula (5), there can be mentioned ω-aminocaproic acid, ω-aminocaprylic acid, ω-aminocapric acid, ω-aminoundecylic acid and ω-aminolauric acid.

Instead of the above-mentioned homo- or co-polyester-amide, there may be used a blend of at least one homo- or co-polyester and at least one homo- or co-polyamide as the adhesive in the present invention. At the melt-mixing of these polyester and polyamide, there is a possibility of formation of a polyester-polyamide block copolymer by the ester exchange reaction. Of course, a blend in which such a block copolymer is formed can be used in the present invention. The blending ratio of the polyester and polyamide is controlled so that the above-mentioned ester group and amide group concentrations can be attained. Ordinarily, it is preferred that the polyester and polyamide be used at a weight ratio of from 90/10 to 10/90.

As the polyester in the adhesive, there can be used not only a polyester containing ester groups in the main chain, which is derived from the dibasic acid and diol components described hereinbefore with respect to the polyester-amide, but also a polyester containing ester groups in the side chains, such as a vinyl ester polymer or an acrylic acid ester polymer. It is preferred that at least one thermoplastic copolyester in which at least 50 mole % of the glycol component is ethylene glycol or 1,4-butane-diol, at least 50 mole % of the dibasic acid is terephthalic acid and at least 1 mole % of the dibasic acid component and/or the glycol component is a dibasic acid other than terephthalic acid and/or a glycol other than ethylene glycol or 1,4-butane-diol be used as the polyester containing ester groups in the main chain. A polymer of a vinyl ester of an organic acid, especially a polymer of a vinyl ester of a fatty acid, is preferred as the polyester containing ester groups in the side chains.

A polyamide derived from the dibasic acid component and diamine component described hereinbefore with respect to the polyester-amide or a polyamide derived from an ω-aminocarboxylic acid may be used as the polyamide.

It is especially preferred that a linear aliphatic homopolyamide or copolyamide having 3 to 30 amide groups on the average per 100 carbon atoms or a blend of such homopolyamides or copolyamides be used as the polyamide.

The above-mentioned polyester units and polyamide units are preferably selected also in case of the above-mentioned polyester-amide.

In the present invention, a thermoplastic polyester composed mainly of ethylene terephthalate units or butylene terephthalate units, especially a polyester containing at least 95 mole % of ethylene terephthalate units, is used for the polyester layer. In view of the mechanical properties of the final vessel, it is preferred that the polyester should have an intrinsic viscosity $[\eta]$ of 0.06 to 0.18 l/g, especially 0.065 to 0.14 l/g, as determined under the above-mentioned conditions.

A copolymer comprising units of an olefin such as ethylene or propylene and vinyl alcohol units obtained by saponifying units of a vinyl ester such as vinyl acetate is used as the olefin-vinyl alcohol copolymer in the present invention. From the viewpoint of the gas barrier property and moisture resistance, it is important that the olefin-vinyl alcohol copolymer should contain 40 to 80 mole %, especially 50 to 75 mole %, of the vinyl alcohol units and the content of the residual vinyl ester units should be lower than 4 mole %, especially lower than 1 mole %. This olefin-vinyl alcohol copolymer has an intrinsic viscosity of 0.07 to 0.17 l/g as measured at a temperature of 30° C. in a mixed solvent comprising 85% by weight of phenol and 15% by weight of water.

This olefin-vinyl alcohol copolymer may be used alone or in the form of a blend with other thermoplastic resin for the gas barrier layer. As a preferred example of the blend, there can be mentioned a blend comprising an olefin-vinyl alcohol copolymer and a polyamide at a weight ratio of from 95/5 to 40/60, especially from 90/10 to 50/50. As described in Japanese Patent Publication No. 42493/82, this blend shows a small oxygene permeation coefficient comparable to that of the olefin-vinyl alcohol copolymer alone and since this blend is excellent in the adaptability to the drawing operation, the blend is advantageously used for the production of vessels by draw-blow-forming or draw-sheet-forming.

In the laminate structure of the present invention, the arrangement of the layers is not particularly critical so far as the ester-amide adhesive (EA) is interposed between the polyester (PT) layer and the olefin-vinyl alcohol copolymer (EV) layer. For example, there may be adopted a five-layer structure of PT/EA/EV/EA/PT shown in FIG. 2, a three-layer structure of PT/EA/EV and a four-layer structure of PT/EA/EV/EA.

The thickness of each of the above-mentioned three layers is not particularly critical, but in order to obtain a optimum combination of the gas barrier property, impact resistance, rigidity and interlaminar peel strength, it is ordinarily preferred that the PT layer be thickest, the EA layer be thinned and the EV layer should have an intermediate thickness. More specifically, it is preferred that the PT/EV thickness ratio be in the range of from 200/1 to 5/1 and the PT/EA thickness ratio be in the range of from 150/1 to 5/1. The laminate in the form of the final vessel has preferably a thickness of 50 to 3000 microns, especially 100 to 2000 microns.

It is preferred that the laminate be formed by multi-layer co-extrusion. According to this multi-layer co-extrusion, since both the resins are mingled in a good condition in the bonding interface between both the resins, a laminate structure which is especially excellent in the adhesion strength can be obtained. At the multi-layer co-extrusion step, the polyester, gas barrier resin and ester-amide type adhesive are melt-kneaded in extruders for the respective resins, and the melts are extruded through a multi-layer multi-ply die in such a positional relation that the ester-amide type adhesive is located between the polyester layer and the gas barrier resin layer, and the extrudate is formed into a film, a sheet, a pipe for a bottle or a preform for a bottle. In case of a preform for a bottle, the extruded melt resin layer laminate pipe is subjected to preliminary blow forming into a preform having the mouth and the bottom in a mold, or the extruded melt multi-layer pipe is quenched and then cut into a predetermined length, and then both the ends of the resulting pipe having openings on both the ends are heated and formation of the mouth and fusion bonding of the bottom are accomplished by compression forming. Thus, a preform for a bottle is obtained.

Formation of the laminate can also be accomplished by so-called hot pressing, sandwich lamination or extrusion coating. For example, a laminate can be prepared by applying the ester-amide type adhesive thinly in the form of a molten film, powder, suspension or solution between a preformed film of the polyethylene terephthalate and a preformed film of the olefin-vinyl alcohol copolymer and, if necessary, heating the assembly under pressure. According to another method, an intermediate layer of the olefin-vinyl alcohol copolymer and inner and outer layers of the ester-amide type adhesive are co-extruded between two polyester films, and the co-extruded layers are pressed in the state sandwiched with the polyester films, whereby a laminate structure is obtained. There can also be adopted a method in which the ester-amide type adhesive and olefin-vinyl alcohol copolymer are extrusion-coated in succession on the surface of a polyester film and a method in which three kinds of preformed films are laminated in the above-mentioned order and then subjected to hot compression or hot rolling.

For formation of a multi-layer preform, there can also be adopted a method in which the ester-amide type adhesive and the olefin-vinyl alcohol copolymer are injected in succession on the inner or outer surface of a bottomed preform composed of polyethylene terephthalate, whereby a preform having a multi-layer structure is obtained.

The laminate structure of the present invention is especially valuable for the production of a vessel by draw-blow-forming or draw-sheet-forming. For example, draw-blow-forming can be performed according to known procedures except that the above-mentioned multi-layer preform is used. More specifically, the multi-layer preform is preliminarily heated at a drawing temperature prior to draw-blowing. The drawing temperature is a temperature lower than the crystallization temperature of the used polyester, at which drawing of the multi-layer preform is possible. Ordinarily, a temperature of 75° to 130° C., especially 80° to 110° C., is adopted as the drawing temperature.

Draw-blow-forming of the preliminarily heated preform can be accomplished by known means such as sequential draw-blow-forming or simultaneous draw-blow-forming. In case of sequential draw-blow-forming, the preform is mechanically drawn in the axial direction by a drawing rod under blowing of a fluid at a relatively small pressure and is then expanded and drawn in the circumferential direction of the vessel under blowing of a fluid at a relatively large pressure. In case of simultaneous draw-blow-forming, a fluid is blown at a large pressure from the initial stage to simultaneously effect drawing in the circumferential direction and drawing in the axial direction. Drawing of the preform in the axial direction can easily be accomplished, for example, by gripping the neck of the preform by a mold and a mandrel, applying a drawing rod on the inner surface of the bottom of the preform and stretching the drawing rod. It is preferred that the draw ratio in the axial direction of the preform be 1.5 to 2.5 and the draw ratio in the circumferential direction of the preform be 1.7 to 4.0.

In the barrel of the thus draw-blow-formed vessel, the polyethylene terephthalate layer is molecularly oriented so that the density (20° C.) of the polyethylene terephthalate layer is in the range of from 1.350 to 1.40 g/cc, and good impact resistance, rigidity and transparency desirable for a bottle-shaped vesel can be obtained and because of the presence of the olefin-vinyl alcohol copolymer layer, an excellent barrier property to gases such as oxygen, nitrogen, carbon dioxide gas and fragrance can be obtained. Furthermore, an excellent interlaminar adhesion can be maintained by dint of the interposed ester-amide adhesive.

In case of sheet forming, the above-mentioned multi-layer film or sheet is preliminarily heated at the above-mentioned drawing temperature and the heated film or sheet is formed into a cup by vacuum forming, air pressure forming, plug assist forming or press forming.

The present invention has been described with reference to a polyester composed mainly of ethylene terephthalate units, but it should be understood that the present invention can similarly be applied to a polyester composed mainly of butylene terephthalate units, which is excellent in the mechanical properties, and also in this case, the above-mentioned advantages can similarly be attained.

The present invention will now be described in detail with reference to the following Examples that by no means limit the scope of the invention.

EXAMPLE 1

Polyethylene terephthalate (PET) having an intrinsic viscosity of 0.085 l/g as measured at 30° C. in a mixed solvent comprising phenol and tetrachloroethane at a weight ratio of 50/50 was used for the polyester layer, an ethylene-vinyl alciohol copolymer (EV-1) having a vinyl alcohol content of 69.0 mole %, an ethylene content of 30.6 mole % and a residual vinyl acetate content of 0.4 mole % was used for the barrier layer, and a resin (EA) obtained by melt-mixing and pelletizing an ethylene terephthalate/isophthalate copolyester (PET/I) having an intrinsic viscosity of 0.088 l/g as measured at 30° C. in a mixed solvent comprising phenol and tetrachloroethane at a weight ratio of 50/50 and a terephthalic acid/isophthalic acid charge ratio of 85/15 and a caprolactam/hexamethylene diammonium adipate copolymer (nylon 6/nylon 6.6 copolymer; N) having a caprolactam concentration of 91 mole % at a mixing weight ratio shown in Table 1 was used for the adhesive layer. An extruder provided with a screw having a dimeter of 50 mm and an effective length of 1300 mm was used for extrusion of the polyester layer, an extruder provided with a screw having a diameter of 30 mm and an effective length of 750 mm was used for extrusion of the adhesive layer, and an extruder provided with a screw having a diameter of 38 mm and an effective length of 950 mm was used for extrusion of the barrier layer. A film having an asymmetric three-layer structure of PET layer/EA layer/EV-1 layer and having a total thickness of 520 microns (PET/EA/EV-1 thickness ratio of 100/3/5) and a width of 300 mm was prepared by using the foregoing three extruders, a three-layer feed block adapter, a single manifold T-type die and a three-roll film forming and winding machine. With respect to the obtained film, the bonding strength between the PET layer and EA layer and the bonding strength between the EA layer and EV-1 layer were measured by a tensile tester (peeling speed of 100 mm/min). The obtained results are shown in Table 1.

For comparison, the above-mentioned copolyester (PET/I) or the above-mentioned caprolactam/hexamethylene diammonium adipate copolymer (N) alone was used for the adhesive layer. The obtained results are also shown in Table 1.

TABLE 1

| Film | Adhesive Layer | Interlaminar Peel Strength (g/1 cm width: T-peel) | |
|---|---|---|---|
| | | PET layer/ adhesive layer* | adhesive layer/ barrier layer** |
| 1-A | PET/I | ∞*** | 30 |
| 1-B | N | 23 | ∞*** |
| 1-C | PET/I/N = 95/5 | ∞*** | 62 |
| 1-D | PET/I/N = 90/10 | 3420 | 860 |
| 1-E | PET/I/N = 80/20 | 3230 | 930 |
| 1-F | PET/I/N = 70/30 | 3140 | 1560 |
| 1-G | PET/I/N = 50/50 | 3020 | 2030 |
| 1-H | PET/I/N = 30/70 | 2060 | 2620 |
| 1-I | PET/I/N = 20/80 | 1630 | 3450 |
| 1-J | PET/I/N = 10/90 | 930 | 3620 |
| 1-K | PET/I/N = 5/95 | 53 | ∞*** |

Note:
*bonding strength between polyester layer and adhesive layer
**bonding strength between adhesive layer and ethylene-vinyl alcohol copolymer layer
***peeling was impossible

EXAMPLE 2

The polyethylene terephthalate (PET) used in Example 1 was used for the polyester layer, an ethylene-vinyl alcohol copolymer (EV-2) having a vinyl alcohol content of 61.0 mole %, an ethylene content of 38.6 mole % and a residual vinyl acetate content of 0.4 mole % was used for the barrier layer, and the blend of PET-/I/N=70/30 used in Example 1 was used for the adhesive layer. By using a five-layer feed block, a single manifold T-type die and a 5-roll sheet forming machine in addition to the three extruders used in Example 1, a sheet having a symmetric three-resin five-layer structure of PET layer/EA layer/EV-2 layer/EA layer/-PET layer and having a total thickness of 2.07 mm (PET/EA/EV-2 thickness ratio of 100/3/5) and a width of 400 mm was formed.

The sheet was quenched so that crystallization was not caused in the PET layer [the density (20° C.) of the PET layer of the obtained sheet was lower than 1.339 g/cm$^3$]. Since the sheet could not be rolled, the sheet was cut into a length of 1000 mm by a traveling cutter just after the forming operation. Then, the obtained sheet was heated at 100° C. by an infrared ray heater and formed into a cup having a flange width of 5 mm, an inner opening diameter of 60 mm, an outer bottom diameter of 40 mm and a height of 80 mm by a plug-assist vacuum/air pressure forming machine.

The average thickness of the barrel of the obtained cup was 0.39 mm and the density (20° C.) of the PET layer of the barrel was 1.35 to 1.365 g/cm$^3$. From the X-ray diffraction photograph, it was found that crystals were highly oriented in the height direction of the cup. The average thickness of the bottom was 0.59 mm and the density (20° C.) of the PET layer of the bottom was 1.35 to 1.362 g/cm$^3$, and it was found that crystals were orinted in the radial direction in the bottom portion. The barrel and bottom were very excellent in the transparency. Rectangular samples having a width of 10 mm and a length of 30 mm were cut out from the barrel and bottom of the cup, and the bonding strength between the PET layer and adhesive layer and the bonding strength between the adhesive layer and EV-2 layer were measured in the same manner as described in Example 1. The obtained results are shown in Table 2.

TABLE 2

| Sample-Collecting Place | Peeling[1] Direction | Interlaminar Peel Strength[2] (g/1 cm width, T-peel) | |
|---|---|---|---|
| | | PET layer/ adhesive layer[3] | adhesive layer/ barrier layer[4] |
| barrel | height direction of cup | 635 | 522 |
| barrel | circumferential direction of cup | 682 | 521 |
| bottom | radial direction | 1030 | 983 |

Note
[1]The height direction of the cup is the direction of the long side of the rectangular sample collected from the barrel, and the height direction indicates that the direction of peeling at the peeling test was the same as the height direction.
[2]The mean value of 10 samples.
[3]The bonding strength between the PET layer and the adhesive layer; the mean value of the outer and inner surface sides of the vessel (cup) in each sample.
[4]The bonding strength between the adhesive layer and the barrier layer; the mean value of the outer and inner surface sides of the vessel (cup) in each sample.

EXAMPLE 3

A polyester-amide resin [R$^1$ in the above general formula (1) stands for a p-phenylene group and R$^2$ and R$^3$ each stand for a hexamethylene group] having a melting point of 264° C. (determined according to the differential thermal analysis method at a temperature-elevating rate of 10° C./min), which was obtained by subjecting N,N'-bis(p-carboxybenzoyl)hexamethylenediamine and hexane-1,6-diol to ester exchange reaction at about 250° C. in the presence of sodium tetrabutyltitanate as a catalyst and then carrying out polycondensation at 270° C., was heated and melted at 280° C., compressed in a hot press and immediately quenched to form a film having a thickness of about 50 microns (this film is designated as "EA-F").

In the same manner as described above, an amorphous film having a density (20° C.) of 1.338 g/cm$^3$ and a thickness of 200 microns was prepared in a hot press from the polyethylene terephthalate (PET) used in Example 1 (this film is designated as "PET-F").

In the same manner as described above, a film having a thickness of 40 microns used prepared in a hot press from the ethylene-vinyl alcohol copolymer having a vinyl alcohol content of 61 mole %, which was used in Example 2 (this film is designated as "EV-2F").

These three films were laminated in the order of PET-F, EA-F and EV-2F, and the assembly was inserted between Teflon-coated metal plates and placed in a hot press maintained at 285° C. under a pressureless condition, and a pressure of 5 Kg/cm$^2$ was applied for 1 minute and the laminate was quenched to obtain a laminated film having a thickness of 190 microns.

With respect to the obtained film, the bonding stength between the PET-F and EA-F layers and the bonding strength between the EF-F and EV-2F layers were measured in the same manner as described in Example 1. The obtained results are shown in Table 3.

The so-obtained laminated film was heated in an oven maintained at 100° C. for 2 minutes, and the film was subjected to simultaneous biaxial drawing at a drawing speed of 100 mm/min by a biaxial drawing machine (supplied by Iwamoto Seisakusho K.K.) to obtain a drawn film having an area draw ratio of 2. With respect to the drawn film, the bonding strength between the PET-F and EA-F layers and the bonding strength between the EF-A and EV-2F layers were measured. The obtained results are also shown in Table 3.

TABLE 3

| Peeled Interface* | Interlaminar Bonding Strength (g/1 cm width: T-peel) | |
|---|---|---|
| | undrawn laminated film | drawn laminated film |
| PET-F/EA-F | 3130 | 1180 |
| EA-F/EV-2F | 2960 | 930 |

Note
*PET-F/EA-F indicates the interface between the polyester layer and adhesive layer and EA-F/EV-2F indicates the interface between the adhesive layer and ethylene-vinyl alcohol copolymer layer.

EXAMPLE 4

The same polyethylene terephthalate (PET) and ethylene/vinyl alcohol copolymer (EV-1) as used in Example 1 were used as a polyester layer and a gas-barrier layer. The same polyethylene terephthalate/isophthalate copolyester (PET/I) and caprolactam/hexamethylene diammonium adipate copolymer (N) as used in Example 1 were melt-mixed at a PET/I to N weight ratio of 80/20 and pelletized to form a resin (EA) which was used as an adhesive layer.

A multilayer pipe extrusion device was constructed by connecting the same three extruders as used in Example 1 for the aforesaid layers to a die for a pipe composed of three-resin five layers through a feed pipe. The above layers were extruded from the multilayer pipe extrusion device. The molten pipe obtained was molded into a pipe having both ends opened and having the dimensions shown below by means of a pipe molding device comprised of a sizing unit, a cooling tank and a cutter.

The resulting pipe composed of symmetrical three-resin five layers (PET/EA/EV-1/EA/PET, PET/EA/EV-1=100/3/5 thickness ratio) had an inside diameter of 20.95 mm, an outside diameter of 27 mm, a thickness of 3.03 mm, a length of 114.6 mm and a weight of 35.5 g.

The upper and lower end portions of the resulting pipe were re-heated by an infrared heater, and by a compression molding method, a threaded mouth portion and a bottom portion were formed to give a preform. That part of the preform which was other than the threaded mouth portion was heated to about 105° C. by an infrared heater, and subjected to biaxial stretching blow molding to form a bottle having a capacity of 1000 ml, a body outside diameter of 77.5 mm, a height of 212 mm, and an average body thickness of 0.345 mm. The body portion had a circular section, and the bottom of the bottle had the shape shown in FIG. 1. The PET layer of the body portion had a density of 1.352 to 1.366 g/cm$^3$. The molecular orientation was examined by a birefringence method. It was consequently found that strong molecular orientation existed in the PET layer in the direction of the height of the bottle and in the circumferential direction. No break was observed in the ethylene/vinyl alcohol copolymer layer. Rectangular specimen having a width of 100 mm and a length of 50 mm was cut out from the body portion of the bottle in the height direction of the bottle. Using the specimens, the interlaminar peel strengths between the PET layer and the EA layer, and between the EA layer and the EV-1 layer were measured in the same way as in Example 2. The oxygen permeability of the bottle at 25° C. was measured by the gas chromatographic method. The results are shown in Table 4.

For comparison, the oxygen permeability of a biaxially stretched PET blow bottle (weight 37 g) obtained by the same molding procedure as above using only polyethylene terephthalate is also given in Table 4.

TABLE 4

| Bottle | Oxygen permeability(*) (cc/m$^2$ · day · atm) | Interlaminar peel(**) strength (g/1 cm width, T peel) | |
|---|---|---|---|
| | | PET layer/ adhesive layer | Adhesive layer/ barrier layer |
| PET bottle | 10.2 | — | — |
| Multilayer bottle | 1.3 | 628 | 418 |

(*)Storage conditions were 20° C.; humidity 100% RH inside the bottle and 55% RH outside the bottle.
(**)The peeling direction is the direction of the height of the bottle. The measurement was made 20 times both on the outer surface side and the inner surface side as in Example 2, and the average of 40 measured values was calculated and defined as the peel strength.

We claim:

1. A multi-layer plastic structure comprising a layer of a polyester composed mainly of ethylene terephthalate units or butylene terephthalate units and a gas barrier layer containing an olefin-vinyl alcohol copolymer, said two layers being laminated together through a layer of a thermoplastic resin adhesive containing recurring ester groups and recurring amide groups wherein said ester groups are at a concentration of 53–990 millimoles per 100 g of the resin and said amide groups are at a concentration of 45 to 840 millimoles per 100 g. of the resin.

2. A hollow-formed vessel composed of a multi-layer plastic structure as set forth in claim 1.

3. A sheet-formed vessel composed of a multi-layer plastic structure as set forth in claim 1.

4. A multi-layer plastic structure as set forth in claim 1, wherein the thermoplastic layer adhesive contains in the polymer chain ester groups at a concentration of 89 to 800 millimoles per 100 g of the resin and amide groups at a concentration of 89 to 800 millimoles per 100 g of the resin.

5. A multi-layer plastic structure as set forth in claim 1, wherein the ratio of the thickness of the polyester layer to the gas barrier layer is in the range of from 200/1 to 5/1 and wherein the thickness ratio of the polyester layer to the adhesive layer is in the range of from 150/1 to 5/1.

6. A multi-layer plastic structure as set forth in claim 1, wherein the thermoplastic resin adhesive has a melting point or flow-initiating temperature of 100° to 280° C.

7. A multi-layer plastic structure as set forth in claim 1, wherein the thermoplastic resin adhesive is a polyester-amide.

8. A multi-layer plastic structure as set forth in claim 7, wherein the polyester-amide comprises recurring units represented by the following formula:

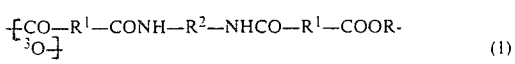

wherein $R^1$ stands for a phenylene group or alkylene group, and $R^2$ and $R^3$ each stand for an alkylene group.

9. A multi-layer plastic structure as set forth in claim 7, wherein the polyester-amide comprises recurring units represented by the following formula:

$$\{O-R^4-CONH-R^5-CO\} \quad (2)$$

wherein $R_4$ and $R_5$ each stand for an alkylene group or aralkylene group.

10. A multi-layer plastic structure as set forth in claim 7, wherein the polyester-amide comprises at least one recurring unit represented by the following formula:

$$\{CO-R^1-COO-R^3-O\} \quad (3)$$

wherein $R^1$ stands for a phenylene group or alkylene group, and $R^3$ stands for an alkylene group, and at least one recurring unit selected from the group consisting of units of the following formula:

$$\{NH-R^2-NHCO-R^6-CO\} \quad (4)$$

and $$\{NH-R^5-CO\} \quad (5)$$

wherein $R^2$ stands for an alkylene group, $R^6$ stands for a phenylene group or alkylene group, and $R^5$ stands for an alkylene group or aralkylene group.

11. A multi-layer plastic structure as set forth in claim 7 wherein the polyester-amide has a melting point or flow-initiating temperature of from 150° to 240° C. and has an intrinsic viscosity of at least 0.01 l/g as measured at a temperature of 30° C. in a mixed solvent comprising phenol and tetrachloroethane at a weight ratio of 50/50.

12. A multi-layer plastic structure as set forth in claim 1, wherein the thermoplastic resin adhesive is a blend or polyester-polyamide a block copolymer containing a polyester and a polyamide at a weight ratio of from 10/90 to 90/10.

13. A multi-layer plastic structure as set forth in claim 12 wherein the polyester is at least one thermoplastic copolyester which is the reaction product of a diol component and a dicarboxylic acid component wherein at least 50 mole% of the diol component is ethylene glycol or 1,4-butane diol, at least 50 mole% of the dicarboxylic acid component is terephthalic acid and at least 1 mole% of the total of the diol component and the dicarboxylic acid component is other than terephthalic acid, ethylene glycol and 1,4-butane diol; and the polyamide is at least one linear aliphatic homopolyamide or copolyamide having 3 to 30 amide groups on the average per 100 carbon atoms.

14. A multi-layer plastic structure as set forth in claim 1, which is a five-layer structure comprised of outer layers of the polyester, an inner layer of the gas barrier layer and the adhesive layer between each of said outer layers and said inner layer.

15. A multi-layer plastic structure as set forth in claim 14, wherein the ratio of the thickness of the polyester layer to the gas barrier layer is in the range of from 200/1 to 5/1 and wherein the thickness ratio of the polyester layer to the adhesive layer is in the range of from 150/1 to 5/1.

* * * * *